United States Patent Office 3,651,027
Patented Mar. 21, 1972

3,651,027
POLYURETHANE BLOCK ELASTOMERS
Jean Robin, Lyon, France, assignor to Rhone-Poulenc S.A., Paris, France
No Drawing. Filed Feb. 7, 1969, Ser. No. 797,675
Claims priority, application France, Feb. 9, 1968,
139,336
Int. Cl. C08g 22/24
U.S. Cl. 260—75 NH  6 Claims

ABSTRACT OF THE DISCLOSURE

The invention provides new polyurethane block elastomers of good mechanical properties and resistance to yellowing made by condensing bis(4-isocyanato-cyclohexyl)methane with an $\alpha,\omega$-dihydroxy macrodiol and coupling the isocyanate-terminated prepolymer obtained with 3,3-bis(aminomethyl)-oxacyclobutane.

---

The present invention relates to polyurethane block elastomers suitable for the manufacture of fibres, films and varnishes, and to their preparation.

Elastomers of the polyurethane block type are well known products generally prepared by condensing an excess of a diisocyanate with a macrodiol to form a prepolymer having terminal isocyanate groups, the molecules of which are coupled by means of difunctional compounds containing active hydrogen atoms. Such difunctional compounds may for example be glycols, diamines, aminoalcohols or dihydrazides. Diamines are the most usually employed coupling agents.

These elastomers, which inter alia possess polyurethane sequences and more generally polyurea sequences, have extremely diverse chemical, physical or mechanical properties depending on the nature of the diisocyanate and of the coupling agent used during their preparation.

In the majority of cases elastomers based on aromatic diisocyanates such as 2,4-diisocyanato-toluene or 2,6-diisocyanato-toluene or bis(4-isocyanatophenyl)methane are preferred because they generally have good mechanical properties. However these elastomers suffer from a very serious defect. When exposed to sunlight they yellow very rapidly and this has the consequence of greatly reducing their use in the filament and fibre field, particularly if textile articles, which keep their whiteness for the greatest part of their use, are desired. Furthermore this colour change is generally accompanied by a degradation of the polymer which results in a significant deterioration in its mechanical properties.

In order to reduce these disadvantages it has been proposed to add various kinds of stabilisers to these elastomers but in general these substances only provide a very inadequate protection which is restricted in duration. It is also frequently observed that if these agents raise the general level of certain properties, they frequently also cause a marked alteration in mechanical properties.

It is known that when the nitrogen atoms of the urethane or urea groups present in these polymers are not directly bonded to aromatic rings, the resistance of the said polymers to sunlight is largely improved. Polyurethane elastomers having such a configuration have however aroused little interest, especially in the textile field, because, with the exception of their stability to light, their properties are generally poor. Furthermore they are generally insoluble or sparingly soluble in the usual polar solvents such as dimethylformamide and dimethylacetamide. The solubility in dimethylformamide is an important factor industrially because it is particularly advantageous to use this solvent in the solution spinning of this type of elastomer.

New polyurethane block elastomers have now been discovered which are very soluble in dimethylformamide and have a combination of mechanical and physical properties which allows their use in the textile field. Thus they have a softening point above 200° C., a high elongation and tensile strength, as well as as a low residual elongation. Furthermore, when these elastomers are exposed to sunlight for a prolonged period, they practically preserve their whiteness and their mechanical properties.

The polyurethane block elastomers of the present invention essentially consist of units of formulae:

Formula I

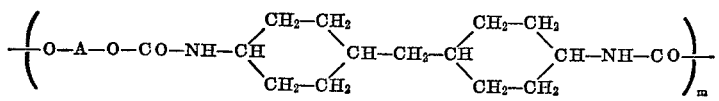

and

Formula II

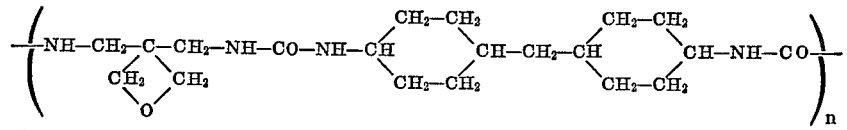

in which $m$ and $n$ represent integers from 20 to 400 and A is such that HO—A—OH is a macrodiol having a molecular weight of 700 to 5000 and a melting point below 80° C.

According to the invention these new polymers are obtained by reacting an excess of bis(4-isocyanato-cyclohexyl)methane with a macrodiol —HO—A—OH as aforesaid to produce an isocyanate-terminated prepolymer, and then coupling the chains of this prepolymer with bis-3,3-(aminoethyl)oxacyclobutane (or bis - 3,3-aminomethyl) oxetane to form a polymer in which the blocks of Formula II are separated from each other by the blocks of Formula I, the coupling reaction being carried out in the presence of a solvent for the final polymer.

The macrodiols which are used in the invention are $\alpha,\omega$-dihydroxy polymers having a molecular weight of 700 to 5000, preferably 1400 to 3500, and a melting point below 80° C. such macrodiols can be polyesters having an acid number preferably less than 10. These polyesters are generally obtained by reaction of one or more carboxylic diacids with an appropriate amount of one or more dialcohols. Among the most commonly used diacids, may be mentioned aliphatic diacids such as succinic acid, glutaric acid, adipic acid, pimelic acid, suberic acid, azelaic acid and sebacic acid; cycloaliphatic diacids such as 1,4-cyclohexanedicarboxylic acid; and aromatic acids such as ortho-phthalic, isophthalic and terphthalic acids. As examples of dialcohols, may be mentioned: 1,2-ethanediol, 1,2- and 1,3-propanediols, 1,2-, 1,3-, and 1,4-butanediols, 1,5-pentanediol, 1,6-hexanediol, 1,10-decanediol and 2,2-dimethyl-propane-1,3-diol.

Another method of producing an $\alpha,\omega$-dihydroxy polyester consists in subjecting a lactone to polycondensation in the presence of a dialcohol.

It is also possible to use α,ω-dihydroxy-polyethers obtained by polycondensation of alkylene oxides, by themselves or conjointly with dialcohols. Suitable alkylene oxides include ethylene oxide, propylene oxide and tetrahydrofuran.

α,ω-Dihydroxy polyester-amides and α,ω-dihydroxy polyurethanes or macrodiols having carbon chains possessing a hydroxyl group at each end of the chain, such as α,ω-dihydroxy polybutadienes and butadiene-isobutylene copolymers can also be used in the present invention.

The bis(4-isocyanato-cyclohexyl)methane used in the preparation of the elastomers of the invention may be a mixture of varying amounts of trans-trans, cis-trans and cis-cis isomers. Thus the product obtained by phosgenation of the bis(4-aminocyclohexyl)methane, the latter being produced by catalytic hydrogenation of the bis(4-aminophenyl)methane, is perfectly suitable. This product contains an average of 60 to 80 parts of trans-trans isomer per 40 to 20 parts of cis-trans isomer, the amount of cis-cis isomer being negligible.

The preparation of the prepolymer with terminal isocyanate groups is carried out by reacting the macrodiol with the bis(4-isocyanato-cyclohexyl)methane at the rate of one molecule of macrodiol per 1.5 to 3, preferably 2, molecules of diisocyanate. The operation is carried out at a temperature not exceeding 150° C., preferably between 100 and 130° C., optionally in the presence of an inert, anhydrous solvent such as toluene, for the time required to react at least 95% of the hydroxyl groups.

The bis(4-isocyanato-cyclohexyl)methane can be added all at once at the beginning of the operation but it is also possible only to use a fraction of the chosen amount of diisocyanate initially, for example between about 1.1 and 1.8 mols per 1 mol of macrodiol, and then to add the rest of the diisocyanate during the heating. This latter process in certain cases makes it possible to improve the properties of the elastomer and especially to reduce the residual elongation.

Coupling between the chains of the prepolymer prepared in this way is effected with 3,3-bis(aminomethyl)-oxetane. This diamine can be very easily obtained from pentaerythritol by the method of Campbell J. Org. Chem. 22, 1029 (1957). The diamine is preferably employed as a solution in a solvent which is inert under the working conditions, and the reaction is carried out in the presence of a solvent for the final polymer, preferably at ordinary temperature. Suitable solvents for the final polymer include dimethylformamide, 1,1,3,3-tetramethylurea, N-methylpyrrolidone, dimethylsulphoxide, and tris(dimethylamino) phosphine oxide. Among these, it is particularly advantageous to use dimethylformamide.

The coupling reaction can be carried out by adding the diamine to the prepolymer or vice versa. If the diamine is introduced into the prepolymer, a premature rise in the viscosity at the end of the reaction can be avoided by adding a small amount of an aliphatic monoamine which preferably has a boiling point below 180° C. under normal atmospheric pressure.

The total amount of amine employed [3,3-bis(aminomethyl)oxetane and optionally, monoamine] corresponds to a number of amine groups representing about 100 to 105% of the number of isocyanate groups of the prepolymer, with the amine groups introduced by the optional use of a monoamine representing at most 5% of the total number of amine groups.

The polyurethane block elastomers produced in accordance with the invention may be obtained as concentrated solutions in dimethylformamide, for example containing more than 30% by weight of polymer. These solutions have a viscosity which does not change with time. They can be used for the formation of filaments by known dry spinning or wet spinning processes, after optional addition of various fillers, the use of which is well known in the art. In this respect, white pigments, such as zinc oxide or titanium oxide may be more especially mentioned.

The examples which follow illustrate the invention. The various mechanical properties quoted in these examples are determined in accordance with French Standard AFNOR T 46 002.

EXAMPLE 1

81.1 g. of toluene and 89.6 g. of a polyester (molecular weight 1791, acid number 1.4, hydroxyl number 61.1, melting point 35–36° C., obtained by esterification of a mixture of 1,6-hexanediol and 2,2-dimethyl-propane-1,3-diol, the molecular ratio of the dialcohols being 80:20, with adipic acid) are introduced into an 0.5 l. borosilicate glass flask.

36.5 g. of toluene are distilled off to dehydrate the mixture and 26.2 g. of bis(4-isocyanato-cyclohexyl)methane (M.P. about 60° C.) dissolved in 36.5 g. of anhydrous toluene, are then added to the solution at 100° C. The mixture is heated under reflux for 2 hours, and, after cooling, a prepolymer solution containing 0.0504 isocyanate groups per 100 g. of solution is obtained.

44 g. of the prepolymer solution diluted with 73 cm.$^3$ of dimethylformamide are introduced into a cylindrical reactor of 250 cm.$^3$ capacity placed under a nitrogen atmosphere, and a solution of 1.306 g. of 3,3-bis(aminomethyl)-oxetane in 39 cm.$^3$ of dimethylformamide is added over the course of 30 minutes with good stirring. A limpid, homogeneous solution of viscosity 20 poises at 25° C. is obtained, which is cast at a thickness of 0.5 mm. After drying at 120° C. for 2 hours, a film is obtained which has the following mechanical and physical properties:

Tensile strength—618 kg./cm.$^2$
Elongation at break—603%
Force for 100% elongation—45 kg./cm.$^2$
Immediate residual elongation after 100% elongation—5–6%
Softening point—200° C.

The light resistance of the film is also measured with the "Xenotest 450" apparatus. In this apparatus the film is subjected to irradiation from xenon lamp which gives a spectrum the composition of which is close to that of sunlight. After 200 hours exposure, the whiteness of the film is identical to that of a sample which has not been subjected to irradiation.

EXAMPLE 2

333 g. of toluene and 370 g. of a polyester (molecular weight 1850, acid number 1.2, hydroxyl number 59.4, melting point 29° C., obtained by esterification of a mixture of 1,6-hexanediol and 2,2-dimethyl-propane-1,3-diol, the molecular ratio of the diols being 66:34, with adipic acid) are introduced into a 2 l. borosilicate glass flask.

253 g. of toluene are distilled off to dehydrate the mixture and 74.1 g. of bis(4-isocyanato-cyclohexyl)methane dissolved in 200 g. of anhydrous toluene are then added to the solution at about 100° C. The mixture is heated under reflux for 45 minutes, 31.7 g. of bis(4-isocyanato-cyclohexyl)methane dissolved in 54 g. of anhydrous toluene are added, and the mixture is then again kept under reflux for 30 minutes. After cooling a prepolymer solution containing 0.0502 isocyanate groups per 100 g. of solution is obtained.

1.3 g. of 3,3-bis(aminomethyl)-oxetane and 112 cm.$^3$ of dimethylformamide are introduced into a cylindrical reactor of 250 cm.$^3$ capacity placed under a nitrogen atmosphere. 44 g. of the prepolymer solution obtained as described above are then added over the course of 35 minutes with good stirring, ¾ of this solution being added in 7 minutes and the remainder in 28 minutes.

The polymer solution thus obtained is divided into two parts. The first part is concentrated to a polymer content of 28% by evaporation at 60–70° C. under a pressure of 4 mm. Hg. A limpid solution is thus obtained, the viscosity of which did not vary after one month's storage at ambient temperature (about 25° C.).

The second part is converted into a film as indicated in Example 1. This film has the following characteristics:

Tensile strength—664 kg./cm.²
Elongation at break—587%
Force for 100% elongation—47.5 kg./cm.²
Immediate residual elongation after 100% elongation—3-4%
Softening point—210° C.

EXAMPLE 3

The procedure of the preceding example is followed, using 589.5 g. of a solution of prepolymer containing 0.0495 isocyanate groups per 100 g. of solution, 17.58 g. of 3,3-bis(aminomethyl)-oxetane and 1600 cm.³ of dimethylformamide. A solution containing 17.2% by weight of polymer is obtained, into which 5% by weight of titanium dioxide, based on the polymer, are introduced. 732 g. of solvent are then removed by distillation at 60–70° C. under a pressure of 4 mm. Hg. The resulting solution has a viscosity of 355 poises at 25° C. and a solids content of 27.7%. This solution is extruded through a spinneret having 13 holes of 0.15 mm. diameter into a coagulation bath containing a mixture of water and dimethylformamide (ratio 25:75 by volume) kept at 25° C.

A filament of 260 deniers gauge is obtained which, after washing and then drying for ½ an hour at 150° C., has a tensile strength of 0.9 g./denier and an elongation at break of 710%.

EXAMPLE 4

325 g. of toluene and 358 g. of a polyester (molecular weight 1790, acid number 0.9, hydroxyl number 61.6, melting point below 25° C., obtained by esterification of 1,2-ethanediol with a mixture of adipic acid and azelaic acid, the molecular ratio of the diacids being 50:50) are introduced into a borosilicate glass flask of 2 l. capacity.

The procedure of Example 1 is then followed, to yield a solution of prepolymer containing 0.0534 isocyanate groups per 100 g. of solution. The operation is continued as described in Example 2, using 1.886 g. of 3,3-bis-(aminomethyl)-oxetane, 160 cm.³ of dimethylformamide and 58.5 g. of prepolymer solution. A limpid solution is obtained which is converted into a film as described in Example 1. This film has the following characteristics:

Tensile strength—611 kg./cm.²
Elongation at break—718%
Force for 100% elongation—42.3 kg./cm.²
Immediate residual elongation after 100% elongation—3-4%
Softening point—210° C.

EXAMPLE 5

121.2 g. of polytetrahydrofuran of molecular weight 2020 and 107 g. of toluene are introduced into a 300 cm.³ flask. 63.4 g. of toluene are distilled to dehydrate the polyether. 22.2 g. of 4,4'-diisocyanato-dicyclohexylmethane of 99% purity and 42.6 g. of toluene are then introduced. The whole is heated for 2 hours under reflux with stirring. The stirring and heating are stopped, and 9.55 g. of 4,4'-diisocyanato-dicyclohexylmethane and 20.8 g. of toluene are then introduced. The mixture is heated for 30 minutes with reflux of the toluene and stirring. After cooling, a prepolymer solution containing 0.0473% of —NCO groups per 100 g. of solution is obtained.

55 g. of this prepolymer solution are run into a 250 cm.³ reactor containing 1.536 g. of 3,3-bis(aminomethyl)-oxetane of 98.2% purity and 145 cm.³ of dimethylformamide; about ¾ of the prepolymer are added in 8 minutes and the remainder in 40 minutes. A limpid polymer solution of 17.4% concentration is obtained having a viscosity of 30 poises at 25° C. A film is prepared from this solution as in Example 1. The film has the following properties:

Tensile strength—472 kg./cm.²
Elongation at break—660%
Force for 100% elongation—33.4 kg./cm.²
Immediate residual elongation after 100% elongation—3-4%
Softening point—198° C.

I claim:
1. A polyurethane block elastomer consisting essentially of $m$ blocks of Formula I:

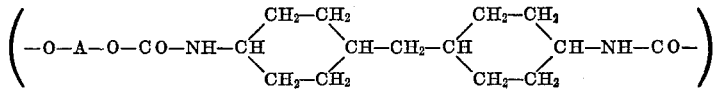

and $n$ blocks of Formula II:

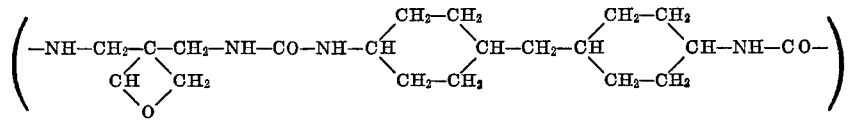

with the proviso that the blocks of Formula II are separated from each other by the blocks of Formula I, in which $m$ and $n$ represent integers from 20 to 400 and wherein O—A—O is a bivalent radical resulting from removal of the terminal hydrogen atoms from a terminal hydroxy macrodiol having a molecular weight of 700 to 5000 and a melting point below 80° C., the molar ratio of bis(aminocyclohexyl) methyl units to the total number of —O—A—O units being from 1.5 to 3.0:1 and the molar ratio of bis(aminomethyl) oxetanyl units to the total number of —O—A—O units being from 0.5 to 2.0:1.

2. An elastomer according to claim 1, in which the macrodiol is an α,ω-dihydroxy-polyester.

3. An elastomer according to claim 2 in which the macrodiol is an α,ω-dihydroxy-polyester obtained by esterification of a mixture of 1,6-hexanediol and 2,2-dimethyl-propane-1,3-diol, with adipic acid.

4. An elastomer according to claim 2 in which the macrodiol is an α,ω-dihydroxy-polyester obtained by esterification of 1,2-ethanediol with a mixture of adipic acid and azelaic acid.

5. An elastomer according to claim 1 in which the macrodiol is an α,ω-dihydroxy-polyether.

6. An elastomer according to claim 5 in which the macrodiol is polytetrahydrofuran.

References Cited

UNITED STATES PATENTS 3,401,143  9/1968  Finelli et al. _____ 260—75
3,449,369  6/1969  Berezin _____ 260—333
3,506,617  4/1970  Collardeau et al. _____ 260—77.5

OTHER REFERENCES

Nikolaev: Chem. Abstracts, vol. 70, 1969, 5249t.
Campbell: Journal of Organic Chem., vol. 22, pp. 1029–1035, 1957.

DONALD E. CZAJA, Primary Examiner

E. C. RZUCIDLO, Assistant Examiner

U.S. Cl. X.R.

57—140; 260—77.5 AM, 77.5 SP, 858